March 17, 1970 R. C. TALBOT 3,500,984
CONVERGER AND FEEDER FOR COOKIES FOR WRAPPING
Filed April 1, 1968 5 Sheets-Sheet 5

INVENTOR.
Richard C. Talbot
BY *Hill, Sherman, Meroni, Gross & Simpson* ATTORNEYS United States Patent Office 3,500,984
Patented Mar. 17, 1970

3,500,984
CONVERGER AND FEEDER FOR COOKIES
FOR WRAPPING
Richard C. Talbot, Skokie, Ill., assignor to Peters
Machinery Company, Chicago, Ill., a corporation
of Illinois
Filed Apr. 1, 1968, Ser. No. 717,688
Int. Cl. B65g 47/26
U.S. Cl. 198—32                                    15 Claims

ABSTRACT OF THE DISCLOSURE

Apparatus for coverging and feeding cookies for wrapping. The apparatus conveys two laterally spaced rows of cookies in counted groups to a single row with the same number of cookies in each group, to be wrapped by a conventional wrapping machine in pre-selected counted groupings. The converger includes a hopper disposed beneath the drop gates of the transfer conveyor of a counting and converging apparatus. The transfer conveyor transfers two rows of counted cookies in pre-selected groups to the hopper. The hopper has two drop bottoms on each side, each of which is aligned with a drop gate in the material carrying path of the transfer conveyor. A cam and linkage drive connection, driven in timed relation with respect to travel of the transfer conveyor is provided to operate the drop gates on opposite sides of the hopper and alternately drop a row of cookies in pre-selected groupings from one side of the hopper and then the other side of the hopper, to converge the cookies into a single row to a wrapping conveyor in the same pre-selected groupings. The drop gates may be operated to drop two rows of cookies into the hopper at one time, while the drop bottoms may operate in pre-selected timed relation with respect to each other, to converge and register the cookies with the spaces between the flights of the wrapping conveyor.

SUMMARY OF THE INVENTION AND OBJECTS

The invention is generally directed to an apparatus for supplying cookies or other articles to be wrapped in pre-selected groups to a single strand wrapping conveyor, conveying the groups of cookies to a wrapping machine, where they may be mechanically wrapped in a conventional manner, without the use of manual labor, heretofore required to separate and supply the cookies to the wrapping machine conveyor, in the required groups for wrapping.

A principal object of the present invention, therefore, is to provide a novel and improved form of apparatus for converging rows of counted cookies in pre-selected groups in each row, and delivering these cookies to a single strand wrapping conveyor taking the converged and separated groups of cookies for wrapping.

Another object of the invention is to improve upon the methods heretofore in use for delivering cookies and the like to a wrapping machine for wrapping in pre-selected groups, by providing a simple and improved means for converging and delivering at least two rows of cookies into a single row to the wrapping machine conveyor.

Still another object of the invention is to provide an improved form of loading apparatus for a single strand delivery conveyor, continuously supplying counted groups of cookies to the conveyor in a more expeditious and simple manner than formerly.

These and other objects of the invention will appear from time to time as the following specification proceeds and with reference to the accompanying drawings.

DESCRIPTION OF THE DRAWINGS

FIGURE 7 is a development view of the cams for operating the drop bottoms for the converging hopper.

DESCRIPTION OF PREFERRED EMBODIMENT OF INVENTION

Figure 1:
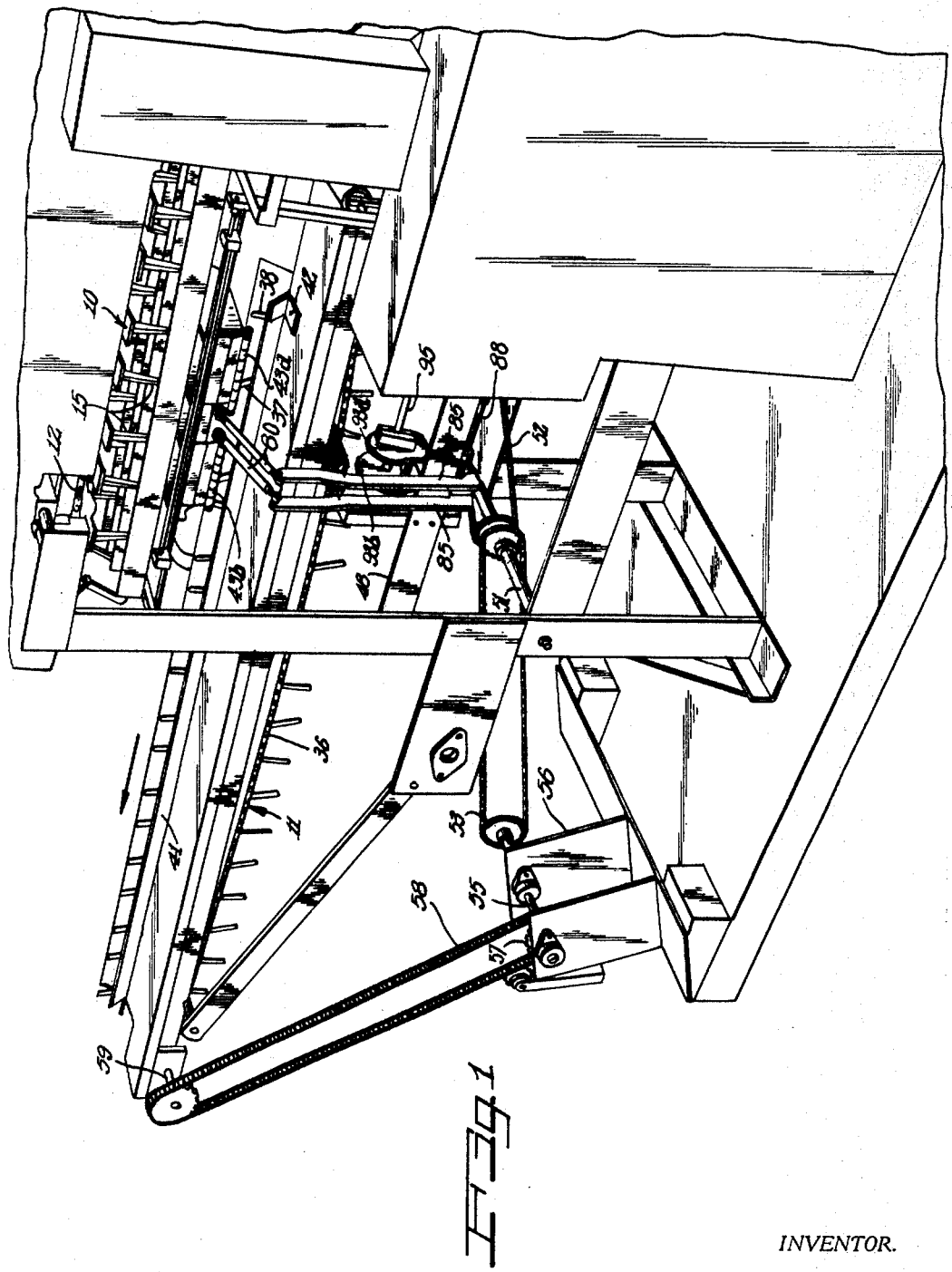
FIGURE 1 is a fragmentary, generally perspective view of the delivery end portion of a transfer conveyor of a cookie separating and counting apparatus showing a cookie wrapping conveyor in cookie receiving relation with respect to the transfer conveyor and showing the converger of the present invention adapted to converge rows of cookies delivered by the transfer conveyor for delivery into the wrapping machine conveyor, in single rows in pre-selected groupings.
Figure 3:
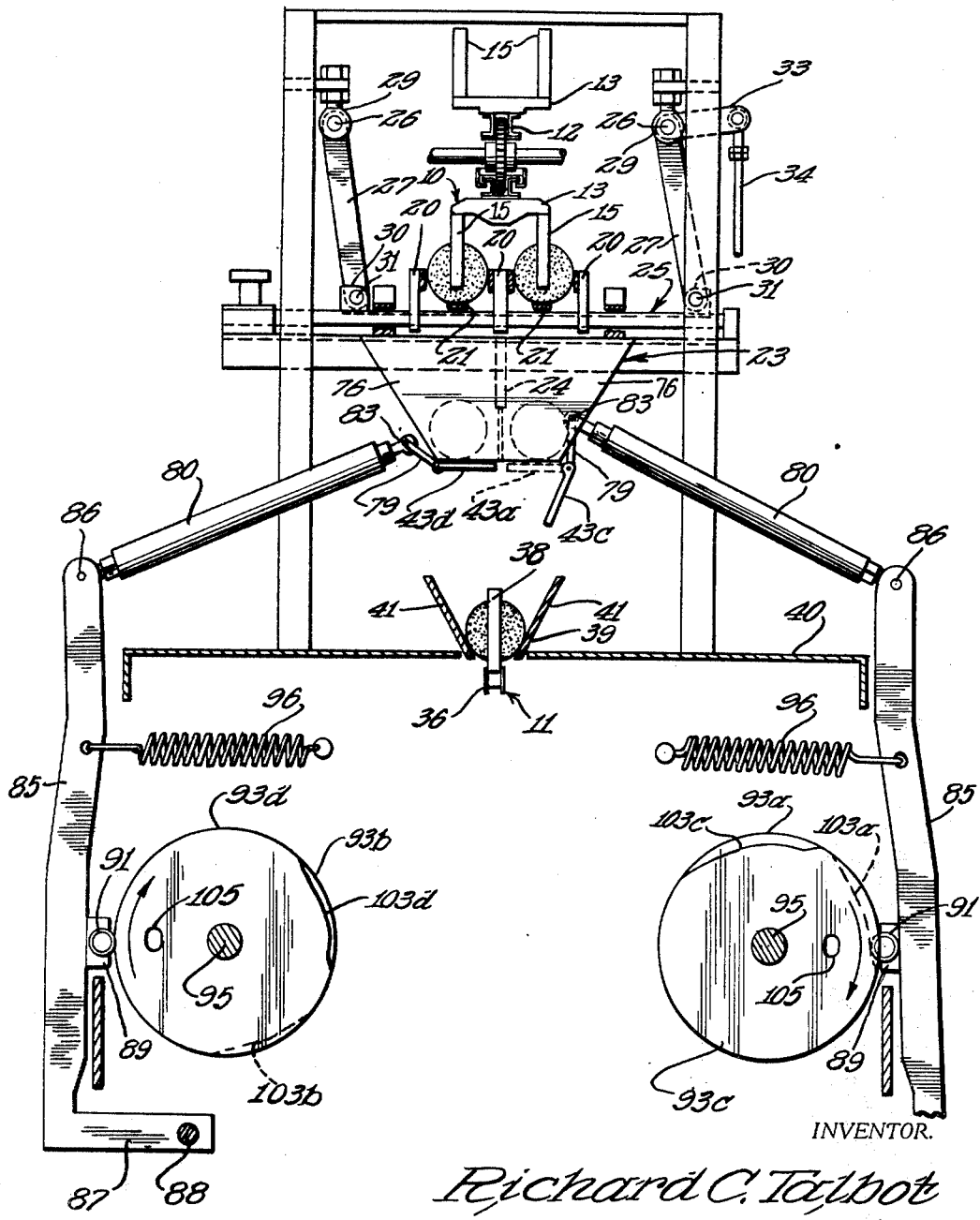
FIGURE 3 is a generally diagrammatic transverse sectional view taken through the transfer conveyor, and showing certain details of construction of the converger of the present invention.

In the embodiment of the invention illustrated in the drawings, I have shown in FIGURES 1 and 3 a transfer conveyor 10, disposed above a wrapping machine conveyor 11, and having laterally and longitudinally spaced flights 15 taking counted groups of cookies in parallel rows from a counting conveyor, (not shown), which separates the cookies into counted pre-selected groups and supplies the groups of cookies in two parallel spaced rows to the transfer conveyor 10.

The transfer conveyor 10 and counting conveyor are shown and described in my Patent No. 3,290,859, dated Dec. 13, 1966. The details of the counting conveyor and transfer conveyor, therefore, need not be shown or described herein.

The transfer conveyor 10, as shown in FIGURES 1 and 3 generally includes an endless chain 12 having spaced flights or attachments 13 secured thereto. Each attachment 13 has a pair of laterally spaced conveyor flights 15, 15 extending downwardly between outer side rails 20, 20 for conveying the rows of cookies along drop gates 21, 21 forming the material carrying surfaces of the conveyor. The drop gates 21 are movable laterally to drop two rows of counted cookies in pre-selected groups into a hopper 23, disposed beneath said transfer conveyor, and of sufficient width to receive two side-by-side rows of cookies, and is of sufficient length to receive at least two groups of cookies in each row. A divider 24 extends along the center of the hopper 23 in alignment with the intermediate rail 20 to retain the cookies dropped by the drop gates 21 to each side of the hopper.

The transfer conveyor 10 is intermittently driven with a dwell as the rows of cookies are dropped into the hopper 23, as shown and described in my prior Patent No. 3,290,859. The drop gates 21, 21 are part of a laterally movable drop gate carriage 25 suspended from rock shafts 26, 26 on pairs of parallel links 27, 27. The rock shafts 26, 26 are journalled in aligned bearing supports 29, 29. The parallel links have shafts 31 mounted on their lower ends, and mounted at their opposite ends in upright brackets 30, on the carriage 25.

The drop gate carriage 25 is moved back and forth in timed relation with respect to travel of the transfer conveyor 10 to drop two rows of uniform groups of cookies into the hopper 23, by rocking movement of a lever arm 33 secured to and extending outwardly of a rock shaft 26. A link 34 is pivotally connected to the outer end of the lever arm 33 and depends therefrom and is pivotally connected at its lower end to a lever arm (not shown) on a rock shaft (not shown) operated to move the drop gates 21 laterally with respect to the guide plates 20, 20, to release groups of cookies to the hopper 23 during each dwell in travel of the transfer conveyor 10. The mechanism for actuating the drop gates in timed relation with respect to travel of transfer conveyor 10 is shown and described in my Patent No. 3,290,859, so need not herein be shown or described further.

The wrapping conveyor 11 is shown as being a single strand chain and flight type of conveyor including an endless chain 36 having vertically extending leading and trailing flight 37 and 38, respectively, spaced therealong. The chain 36 is trained for movement along a slot 39 extending along the center of a table top 40 for the wrapping conveyor, and in direct alignment with a center line midway between the flights 15, 15 of the transfer conveyor 10. Diverging side walls 41 diverge from opposite sides of the slot 39 and are mounted on the table top 40 by angle brackets 42. The side walls 41 terminate closely adjacent leading drop bottoms 43a and 43b and trailing drop bottoms 43c and 43d pivotally mounted on opposite lower side portions of the hopper 23. The drop bottoms 43a and 43c are on one side of the hopper 23, while the drop bottoms 43b and 43d are on the opposite side of the hopper. Said drop bottoms may be operated in various desired sequences to drop and guide cookies in said hopper into the space between the diverging side walls 41 of the wrapping conveyor, as will hereinafter be more clearly described as this specification proceeds.

A speed reducer 45 of a conventional form having right angle drive shafts 46 and 47 is shown as being mounted on a main frame 48 for the apparatus, beneath the hopper 23. Said speed reducer serves to drive the wrapping conveyor 11 and to raise and lower the drop bottoms 43 for the hopper 23, in the required timed relation with respect to each other.

The speed reducer 45 is of a conventional form and is driven from the drive mechanism for driving the transfer conveyor 10, through a chain and sprocket drive 49, having drive connection with the shaft 46. The drive to the transfer conveyor 10 is like that shown and described in my prior Patent No. 3,290,859, so need not herein be shown or described further.

The speed reducer 45 has a third drive shaft (not shown) which serves to drive a countershaft 51 through a chain and sprocket drive 52. The countershaft 51 in turn serves as a drive shaft for the wrapping conveyor 11 through a chain and sprocket drive 53 driving a drive shaft 55 journalled in a mounting frame 56 mounted on and extending upwardly of the base for the apparatus. The drive shaft 55 has a sprocket 57 thereon driving a conveyor drive shaft 59 through a chain and sprocket drive 58. The drive shaft 59 has a conventional sprocket (not shown) keyed or otherwise secured thereto, meshing with the conveyor chain 36 of the wrapping machine conveyor 11, for driving said conveyor chain in the same direction as the transfer conveyor chain 10. The reduction gearing of the speed reducer 45, and the chain and sprocket drives 49, 52 and 58 provide the proper reduction in speed to time travel of the flights 37 and 38 with travel of the flights 15, to position the flights 37 and 38 to receive two groups of cookies in the spaces therebetween, each time the drop bottoms 43 on opposite sides of the hopper 23 are alternately operated to drop and converge two rows of cookies in said hopper into a single row, as discharged onto the wrapping conveyor 11.

Figure 4:
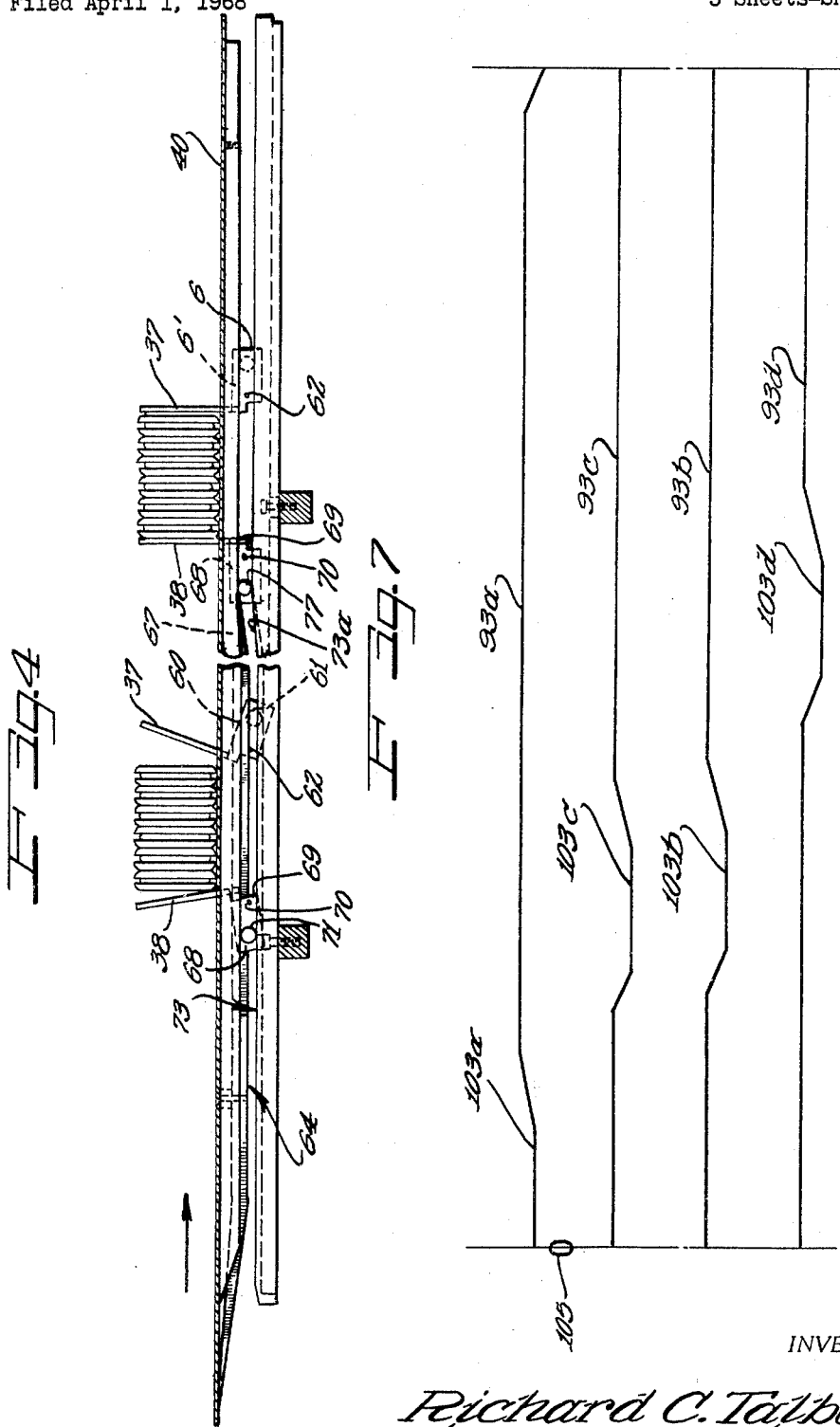
FIGURE 4 is a fragmentary longitudinal sectional view taken along the wrapping machine conveyor.
Figure 5:
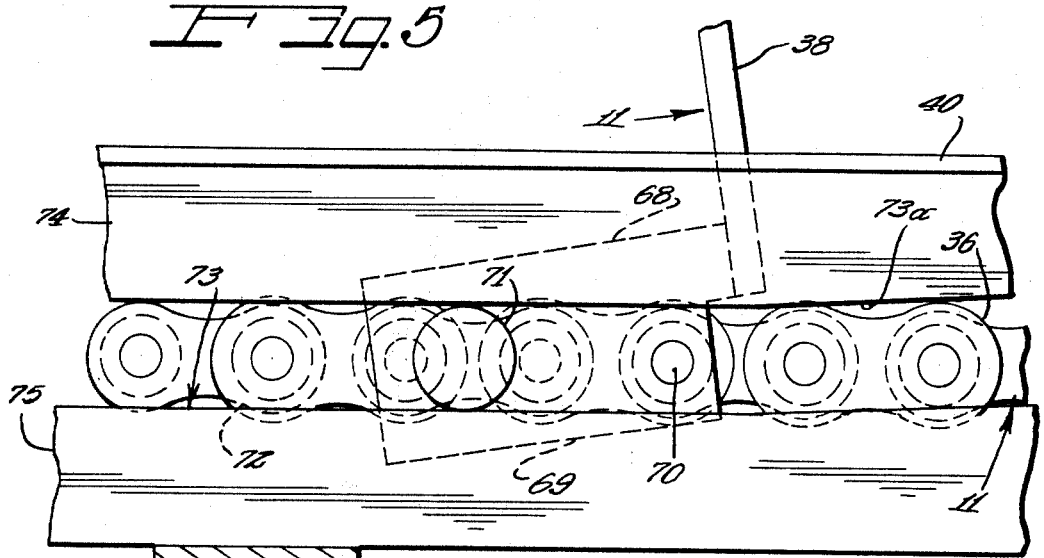
FIGURE 5 is an enlarged fragmentary longitudinal sectional view illustrating certain details of a trailing flight of the wrapping machine conveyor.
Figure 6:
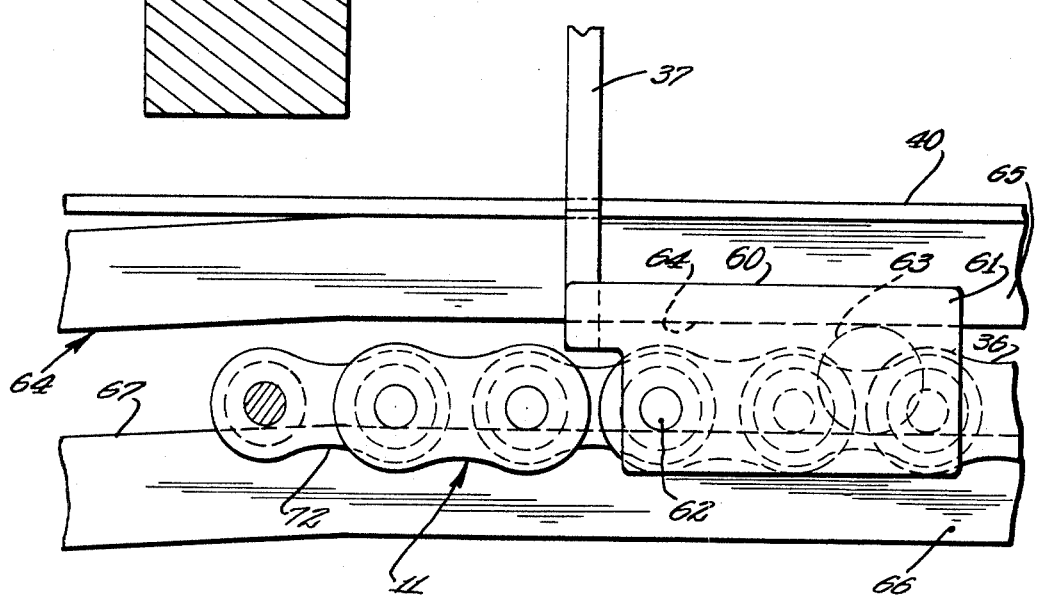
FIGURE 6 is a view somewhat similar to FIGURE 5, but showing certain details of a leading flight of the wrapping machine conveyor.

The leading flights 37 and trailing flights 38 are shown in FIGURE 4 as pivoted to the chain 36 and guided or cammed to incline the leading flights in a forward direction with respect to the chain 36 and incline the trailing flights in a rearward direction with respect to said chain as passing beneath the hopper 23, and to then move the leading and trailing flights generally perpendicular with respect to the chain 36 and table top 40, as the flights move towards the discharge end of the packaging conveyor, to close the space between the leading and trailing flights and to hold the cookies of the groups of cookies in generally vertical positions with respect to the conveyor, to be inserted in the wrapping machine wrapper, in a manner which is not herein shown or described since it forms no part of the present invention.

The leading flight 37 extends upwardly of a generally U-shaped mounting member 60 having parallel spaced straps 61 extending in advance of the flight 37 along opposite sides of the chain 36. A pivot pin 62, which may be a pintle pin, pivotally connects the straps 61 to the chain 36, to pivot about a transverse axis disposed in advance of but closely adjacent the flight 37. A follower lug 63 extends outwardly of one strap 61 and has engagement with a camming slot 64 disposed beneath and extending along the table top 40, to one side of the slot 39. The camming slot 64 is formed between two vertically spaced camming strips 65 and 66 suitably mounted on the underside of the table top 40 and so formed as to incline the leading flight 37 about the axis of the pintle pin 62 to lead said pintle pin when passing beneath the hopper 23. The camming slot 64 has a sloping camming surface 67 sloping upwardly toward the discharge end of the conveyor to cam the flight 37 into a generally vertical position toward the discharge end of the conveyor to close the space between the flights 37 and 38.

In like manner the trailing flight 38 is mounted on the chain 36 on a mounting bracket 68 having parallel spaced straps 69. A pivot pin 70 which may be a pintle pin connecting two links of the chain together and disposed closely adjacent the flight 38, is provided to pivotally mount said flight on the chain 36. The straps 69 extend rearwardly of the flight 38. A follower lug 71 extends from one strap 69 on the opposite side of the chain from the follower lug 63 and engages a camming surface 73 formed between two vertically spaced camming straps 74 and 75. The camming surface 73 holds the trailing flight 38 in generally receding relation with respect to the flight 37 to be inclined backwardly from the chain 36, to provide a generally hopper like space between the flights for receiving a group of cookies each time a drop bottom 43 is released. The camming surface 73 has a sloping surface 73a sloping upwardly as the flights 38 leave the hopper 23, to move the flights 38 into parallel relation with respect to the flights 37, and hold the articles in closed vertical position for wrapping.

Referring now in particular to the hopper 32 and the drop bottoms 43 of said hopper, the hopper 23 has two pairs of aligned oppositely sloping side walls 76 converging toward the side walls 41 of the wrapping conveyor 11, to position the drop bottoms 43 on opposite sides of said hopper to successively drop a row of cookies onto the wrapping conveyor 11.

Figure 2:
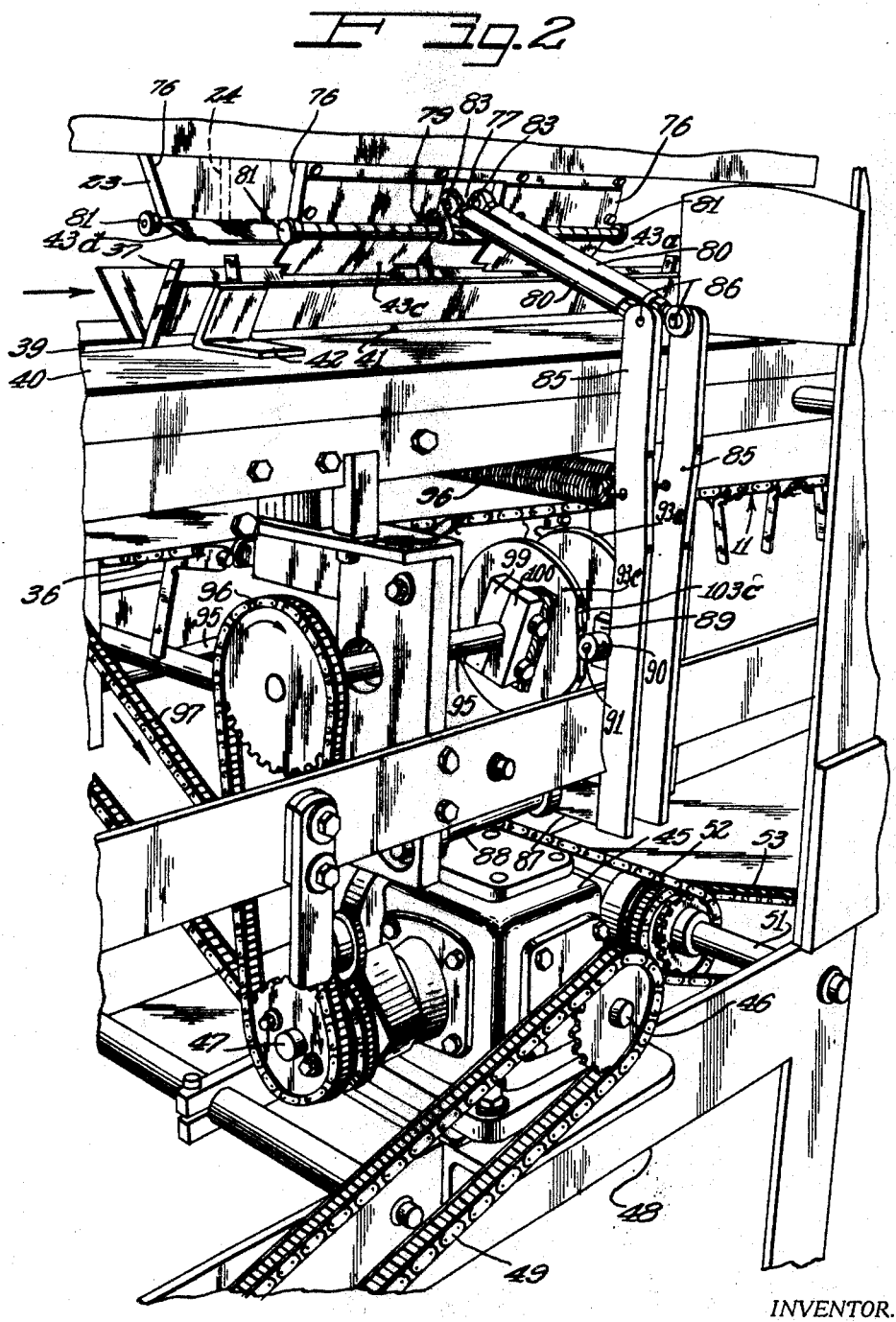
FIGURE 2 is an enlarged, fragmentary, generally perspective view illustrating certain details of the converger of the present invention and looking at the opposite side of the machine from FIGURE 1.

As shown in FIGURES 1 and 2 the converging side walls 76 on each side of the hopper are spaced apart at their adjacent ends to leave a gap 77 therebetween, for crank arms 79 and links 80 pivoted thereto. Said crank arms and links serve to operate the drop bottoms 43 independently of each other, and in pre-selected timed relation with respect to each other. The lengths of the converging side walls 76 are such as to receive preselected groups of cookies transferred thereto by the transfer conveyor 10, each time the drop gates 21 are moved out of supporting relation with respect to the cookies. A first drop bottom 43a interleaves the lower end portion of a wall 76 and is pivotally connected thereto as by a pivot pin 81. The second, third and fourth drop bottoms 43b, 43c and 43d are pivotally connected to the respective side walls 76 by similar pivot pins 81. The cranks 79 are keyed or otherwise secured to the inner ends of the pivot pins 81 and extend upwardly therefrom within the gap 77 and are pivotally connected to the links 80 as by pivot pins 83.

The links extend outwardly of the hopper 23 and are piovtally connected at their outer ends to the upper ends of individual lever arms 85, on pivot pins 86. The lever arms 85 extend downwardly along the outside of the main frame 48 and each have an inwardly extending lower arm portion 87 pivotally mounted on a pivot shaft 88 suitably supported in the main frame 48.

Each lever arm 85 has a lug 89 extending inwardly therefrom intermediate the ends of said lever arm, and has a follower roller 90 rotatably mounted on said lug on a pivot pin 91. One follower roller 90 is engageable with the face of an associated cam 93a to effect rocking movement of the lever arms 85 and crank arms 79 upon rotation of said cam, and to thereby effect raising and lowering of the drop bottom 43a of the hopper 23. The other follower rollers 90 engage individual cams 93b, 93c and 93d to operate the respective drop bottoms 43b, 43c and 43d.

The cams 93a and 93c on one side of the machine are mounted on and rotatably driven by a cam shaft 95 suitably journalled in the frame structure 48. The cams 93b and 93d on the opposite side of the machine are driven by a similar cam shaft 95. The cam shaft 95 on one side of the machine is driven from the shaft 47 of the speed reducer 45 through a chain and sprocket drive 96. The cam shaft 95 on the opposite side of the machine is driven at the same rate of speed as the shaft driven from the chain and sprocket drive 96 and in the same direction through a chain and sprocket drive 97, driven from the shaft 47, and having drive connection with a sprocket (not shown) on the shaft cam 95.

As shown in FIGURE 2, the drive from the shafts 95 to the cams 93a, 93b, 93c and 93d includes a separate set of clamping blocks 99 and 100 for each cam. The block 100 extends partially about a shaft 95 and is welded to an associated cam. The block 99 extends partially about the other half of the same shaft 95 and is adapted to abut the damping block 100. Machine screws 101 extend through the block 100 and are threaded in the block 99, to bring the two blocks into clamping engagement with the shaft 95 and to accommodate adjustable movement of said cams with respect to said shafts.

The cams 93a, 93b, 93c and 93d each have circular peripheries having recessed camming surfaces 103a, 103b, 103c and 103d respectively therein, along which the respective followers ride, to effect opening of an associated drop bottom by the action of the tension springs 98.

Each cam 93a, 93b, 93c and 93d has a slot 105 therein spaced radially of the axis of rotation thereof, forming a base point in the development of each cam, and also forming an indexing point enabling the cams to be properly set on their respective cam shafts 95 as indicated in FIGURE 3.

FIGURE 7 shows the development and arrangement of the four cams 93a, 93b, 93c and 93d, for operating the four drop gates in a selected sequence. Said cams are arranged on their cam shafts 95 to drop a first drop bottom 43a on one side of the hopper and to then drop a third drop bottom 43c on the same side of the hopper in a delayed time interval to correspond to the spacing of the sets of leading and trailing flights 37 and 38. A second drop bottom 43b on the opposite side of the hopper will then be dropped shortly after dropping the drop bottom 43c to position the cookies dropped from the drop bottom 43b to lead the cookies dropped from the drop bottom 43c. After each drop bottom is dropped it is held open a sufficient length of time to deposit its cookies onto the conveyor 11 and is then returned to its closed position, to retain a next succeeding group of cookies dropped from the drop gates 21 to the hopper 23, until the drop bottoms are again operated in a selected sequence to converge the two rows of cookies into a single row as deposited onto the conveyor 11. It is, of course, understood that the groups of cookies and number of cookies in each group may be varied, by varying the spacing between the flights 15 on the transfer conveyor and varying the quantity of counted cookies delivered thereto, as in my Patent No. 3,290,859, and by varying the length of the hopper and the spacing between the flights 37 and 38 on the wrapping machine conveyor.

It should also be understood that by rearranging the cams on the cam shafts 95, the drop bottoms can be dropped in any desired sequence. As for example, the two drop bottoms 43a and 43c may be opened at one time, and as these drop bottoms are moving to their closed positions, the drop bottoms 43b and 43d may be opened. The drop bottoms may also be opened in staggered relation with respect to each other if desired, with a drop bottom 43a opening first and a drop bottom 43d then opening.

While I have herein shown and described one form in which the invention may be embodied, it may readily be understood that various variations and modifications in the invention may be attained without departing from the spirit and scope of the novel concepts thereof.

I claim as my invention:

1. In an apparatus for converging laterally spaced rows of articles into single rows for wrapping,
   conveying means for transferring laterally spaced rows of articles in pre-selected groupings,
   a hopper disposed beneath said conveying means and of a width to receive two side-by-side rows of articles,
   means operable to drop at least two side-by-side rows of articles from said conveying means into said hopper,
   said hopper having at least two drop bottoms,
   each drop bottom disposed beneath and registering with a row of articles on said conveying means,
   means for operating said drop bottoms in a pre-selected sequence to support one row of articles, and
   to release a next adjacent row of articles supported thereon, into a single row beneath said hopper, for wrapping.

2. The structure of claim 1,
   wherein the drop bottoms are pivotally connected to opposite sides of said hopper and extend toward the center of said hopper, and
   wherein the means operating said drop bottoms to converge articles into a single row comprise cam and link means driven in timed relation with respect to travel of said conveying means.

3. The structure of claim 1,
   wherein at least two longitudinally aligned drop bottoms are pivotally connected to each side of said hopper,
   wherein individual cam and link means are provided for each drop bottom, to sequentially operate said drop bottoms on opposite sides of said hopper, to converge the cookies supported thereon into a single row.

4. The apparatus of claim 1,
   wherein second conveying means are disposed beneath said hopper and extend along the extended longitudinal center thereof and have side walls diverging from the material carrying surface of said conveying means at equal angles with respect to the center line of travel of said conveying means for guiding the rows of articles discharged from said hopper into single rows for wrapping.

5. The apparatus of claim 3, wherein the second conveying means comprises a single strand conveyor chain traveling in the same direction as said first mentioned conveying means, and having spaced leading and trailing flights extending vertically of the material carrying run thereof and movably connected to and extending vertically of said conveyor chain, and wherein controlling means are provided for said flights to angularly incline the leading flights in a forward direction with respect to said single strand chain when passing beneath said hopper, and to move to generally vertical positions to close the space between said flights toward the discharge end of said second conveyor.

6. The apparatus of claim 5, wherein connected straps extend along opposite sides of said single strand chain and are transversely pivoted thereto at intervals therealong, wherein said flights are mounted on and extend upwardly of said straps, wherein said straps extend forwardly of the leading flights and rearwardly of the trailing flights, wherein at least one strap extending forwardly of each leading flight has a follower extending laterally outwardly therefrom, wherein at least one strap trailing each trailing flight has a follower extending outwardly therefrom in an opposite direction from the follower extending from the leading flight, and wherein the controlling means comprises cam means extending along opposite sides of said conveyor chain and having camming engagement with said followers for inclining the leading flights forwardly with respect to said chain and inclining the trailing flights rearwardly with respect to said chain, when passing beneath said hopper, and then moving the leading flights into generally vertical positions to close the space between the groups of articles therebetween.

7. The structure of claim 6, wherein two aligned drop bottoms are pivotally connected to each side of said hopper and extend toward the center thereof, wherein an individual cam is provided for operating each drop bottom for lowering a leading drop bottom on one side of said hopper in pre-selected timed relation with the trailing drop bottom on the same side of said hopper, to time the dropping of groups of articles from said hopper with respect to the spacing of said articles on said conveying means and the spacing between said flights on said second conveyor.

8. In an apparatus for converging laterally spaced rows of articles such as cookies and the like into single rows in pre-selected groupings for wrapping, a transfer conveyor having laterally and longitudinally spaced flights movable along a generally horizontal plane for transferring laterally spaced rows of articles in pre-selected longitudinally spaced groupings for wrapping, a pair of longitudinally extending drop gates registering with said flights of said transfer conveyor and forming article supporting surfaces, a hopper disposed beneath said transfer conveyor and drop gates, means operable to move said drop gates laterally to drop at least two side-by-side rows of articles into said hopper, two aligned drop bottoms pivotally connected to each side of said hopper and extending toward the center of said hopper, and means alternately operating said drop bottoms on each side of said hopper to alternatively drop a row of articles and to converge the two rows of articles into a single row of articles.

9. The structure of claim 8, wherein said drop gates are operable to simultaneously drop at least two groups of articles at a time, wherein the leading and trailing drop bottoms are separated from each other to maintain the articles in their groupings, and wherein the trailing drop bottoms are operated by said cam means to drop prior to dropping of said leading drop bottoms to conform the dropping of groups of articles to the spacing of said flights on said transfer and wrapping conveyors, 10. The structure of claim 8, wherein the means alternately operating said drop bottoms on opposite sides of said hopper comprise cam and link means operatively connected with said drop bottoms to alternately drop said drop bottoms on opposite sides of said hopper.

11. The structure of claim 10, wherein a second conveyor is disposed beneath said hopper and includes, a single strand conveyor chain traveling in the same direction as said first mentioned conveying means and having spaced leading and trailing flights extending vertically of the material carrying run of said conveyor chain, and wherein control means are provided for said flights to angularly position the leading flights in a forwardly inclined direction and respect to said chain when passing beneath said hopper and to move to generally vertical positions to close the space between said flights, as said flights leave said hopper.

12. The structure of claim 9, wherein an individual cam is provided for operating each drop bottom, for lowering a leading drop bottom on one side of said hopper in different timed relation than the trailing drop bottom on the same side of said hopper to time the dropping of groups of articles from said transfer conveyor with the spacing of the flights on said second conveyor.

13. In a cookie converging and conveying apparatus converging double rows of articles into single rows, and conveying the single rows in separated counted groups for wrapping, a conveyor including a single strand chain having a horizontal conveying run having sets of leading and trailing flights extending upwardly therefrom and spaced along said single strand chain, a hopper disposed above said conveyor, having drop bottoms pivotally connected to each side thereof and selectively operatable to guide and converge at least two side-by-side rows of articles into single rows of articles in pre-selected groupings, in the spaces between said sets of leading and trailing flights, means for operating said drop bottoms in a pre-selected sequence, and control means for said flights inclining said leading and trailing flights of each set of leading and trailing flights outwardly with respect to each other when traveling beneath said hopper, to provide sets of traveling hopper-like diverging leading and trailing flights to facilitate the depositing of groups of articles therebetween, said control means moving said flights to extend generally vertically of said chain when beyond said hopper, to close the spacing between said articles for wrapping.

14. The apparatus of claim 13, wherein connected straps extend along opposite sides of said single strand chain and are transversely pivoted thereto at intervals therealong, wherein said flights are mounted on and extend upwardly of said straps when on their material carrying run, wherein said straps extend forwardly of the leading flights and rearwardly of the trailing flights.

wherein at least one strap extending forwardly of each leading flight has a follower extending laterally outwardly therefrom, wherein at least one strap trailing each trailing flight has a follower extending outwardly therefrom in an opposite direction from the follower extending from the leading flight, and wherein the controlling means comprises cam means extending along opposite sides of said single strand chain and having camming engagement with said followers for inclining the leading flights forwardly with respect to said chain and the trailing flights rearwardly with respect to said chain, when passing beneath said hopper, and then moving the flights to close the space between the groups of articles therebetween towards the discharge end of said conveyor.

15. The apparatus of claim 13, wherein connected straps extend along opposite sides of said single strand chain and are transversely pivoted thereto at intervals therealong, wherein said flights are mounted on and extend upwardly of said straps when on their material carrying run, wherein said straps extend forwardly of the leading flights and rearwardly of the trailing flights, wherein at least one strap extending forwardly of each leading flight has a follower extending laterally outwardly therefrom, wherein at least one strap trailing each trailing flight has a follower extending outwardly therefrom in an opposite direction from the follower extending from the leading flight, and wherein the controlling means comprises cam means extending along opposite sides of said single strand chain and having camming engagement with said followers for inclining the leading flights forwardly with respect to said chain and the trailing flights rearwardly with respect to said chain, and moving the flights into generally vertical positions to close the space between the groups of articles towards the discharge end of said conveyor.

References Cited
UNITED STATES PATENTS 3,402,803  9/1968  Griner _____ 198—32

EDWARD A. SROKA, Primary Examiner

U.S. Cl. X.R.

53—159